United States Patent [19]

Kreiger

[11] 4,113,481

[45] Sep. 12, 1978

[54] GREEN BALLS FORMED BY AGGLOMERATING WET-COLLECTED FUME PRODUCED IN METALLURGICAL FURNACES

[75] Inventor: John W. Kreiger, Bethlehem, Pa.

[73] Assignee: Bethlehem Steel Corporation, Bethlehem, Pa.

[21] Appl. No.: 734,771

[22] Filed: Oct. 18, 1976

Related U.S. Application Data

[62] Division of Ser. No. 592,287, Jul. 1, 1975, Pat. No. 4,004,916.

[51] Int. Cl.² .................... C22C 33/02; C22C 39/54
[52] U.S. Cl. ........................................ 75/256; 428/539
[58] Field of Search ............... 75/1, 3, 4, 5, 25, 445, 75/950, 951, 256; 23/313 P; 428/402, 539, 542; 264/117

[56] References Cited

U.S. PATENT DOCUMENTS

| | | | |
|---|---|---|---|
| 1,994,379 | 3/1935 | Williams et al. | 75/3 |
| 2,173,535 | 9/1939 | Francis | 75/12 |
| 2,205,043 | 6/1940 | Mican et al. | 75/3 |
| 3,169,054 | 2/1965 | Werner | 75/3 |
| 3,318,685 | 5/1967 | Handwerk | 75/5 |
| 3,403,018 | 9/1968 | Thom | 75/25 |
| 3,652,260 | 3/1972 | Azami | 75/3 |
| 3,770,415 | 11/1973 | Carignani et al. | 75/25 |
| 3,770,416 | 11/1973 | Goksel | 75/25 |
| 3,836,353 | 9/1974 | Holley | 75/25 |

*Primary Examiner*—L. Dewayne Rutledge
*Assistant Examiner*—Michael L. Lewis
*Attorney, Agent, or Firm*—Joseph J. O'Keefe; Charles A. Wilkinson; John S. Simitz

[57] ABSTRACT

Green balls suitable for charging into a metallurgical furnace characterized by having sufficient strength to resist degradation during transport and charging into said furnace, made by agglomerating iron-bearing fume produced in steelmaking furnaces.

2 Claims, No Drawings

GREEN BALLS FORMED BY AGGLOMERATING WET-COLLECTED FUME PRODUCED IN METALLURGICAL FURNACES

CROSS REFERENCES

This application is a division of my U.S. application Ser. No. 592,287 filed July 1, 1975, now U.S. Pat. No. 4,004,916 entitled "Method for Agglomerating Wet-Collected Fume for Use in Metallurgical Furnaces and Agglomerates Produced Thereby."

BACKGROUND OF THE INVENTION

This invention is directed to green balls formed by agglomerating wet-collected iron-bearing fume and water-leached dry-collected iron-bearing fume and mixtures thereof produced in steelmaking furnaces. The green balls have sufficient strength to resist degradation during the handling required to transport and charge them into a steelmaking furnace. Green balls may be defined as agglomerates which have been formed into generally spherical shapes which have not been formed into generally spherical shapes which have not been hardened by heating to a relatively high temperature. The green balls may be either moist or may have been dried, but will not have been hardened at elevated temperatures such as would cause bonding of the component particles due to sintering together of the particles.

Fume formed in steelmaking furnaces during the refining of molten iron consists of fine particles of various elements and metallic and non-metallic compounds, such as iron oxides, zinc oxides, lead oxides, sulfur and sulfur compounds, carbon, silica, alumina, lime, magnesia and the like. These particles are volatilized at the high temperatures within the steelmaking furnaces near the surface of the molten metal, condensed at lower temperatures and carried out of the furnaces by the furnace exhaust gases. The particles range in size from about one tenth of a micron to 25 microns or more in diameter. Usually more than about 90% of the particles will be less than 25 microns in diameter. The nature of fume from steelmaking furnaces is discussed in some detail in the following articles: (a) "Progress Review No. 63: The Formation and Suppression of Oxide Fume in Steelmaking"; Munro et al, Journal of the Institute of Fuel; March 1971, pp. 156–163, (b) "A New Look at the Cause of Fuming"; Morris et al, Journal of Metals; July 1966, pp. 803–810.

Because of their small size and weight, particles of fume are easily carried out of the furnaces through the furnace stacks to the atmosphere. Therefore, in order to prevent pollution of the atmosphere, the exhaust gases from steelmaking furnaces are customarily passed through air pollution control devices, for example wet scrubbers, dry electrostatic precipitators, bag-houses and the like which remove a substantial portion if not all of the fume from the exhaust gases. Since fume from steelmaking furnaces usually contains a relatively high percentage, for example over 50%, of iron in the form of iron oxides, it is economically desirable to recover the iron. It is possible to reuse the fume as charge material for steelmaking furnaces. However, because of the fine particle size of the collected fume, it is impractical to charge the fume, without some further treatment, into steelmaking furnaces, because the fume would merely be blown or carried out of the furnaces by the exhaust gases.

Wet-collected fume has in the past been agglomerated in order to increase the effective size of the particles. However, the moist agglomerates so formed do not possess sufficient strength to support a load and hence cannot be successfully transported, stored or charged into steelmaking furnaces without degradation of the agglomerated fume. Attempts to increase the strength of the moist agglomerates by low temperature drying have failed and in addition the dried agglomerates have spalled and cracked.

Moist fume can be balled and the green balls dried and then treated at elevated temperatures within the usual sintering or indurating ranges to produce heat-hardened pellets which do have sufficient strength to support a load and which can be transported and charged into steelmaking furnaces. However, the production of heat-hardened pellets is expensive because of the temperatures involved and has not generally been commerically attractive.

Dry-collected fume from steelmaking furnaces, such as is frequently collected from open hearth furnace exhaust gases, can contain relatively high contents of sulfur, for example 0.30% by weight. Because of the relatively high sulfur content, the fume cannot be used as a charge material in steelmaking furnaces without preliminary treatment to lower the sulfur content. The dry-collected fume is usually treated by water leaching to reduce the sulfur content to acceptable levels, for example, under 0.20% by weight. The water leached dry-collected fume is, however, difficult to agglomerate. The agglomerates formed from water leached fume do not possess sufficient strength to support a load and cannot be transported, stored or charged into steel-making furnaces without degradation of the agglomerates unless the agglomerates are also first treated at elevated temperatures in order to heat harden them.

It is the object of this invention to produce green balls suitable for charging into steelmaking furnaces from iron-bearing wet-collected fume and mixtures of wet-collected fume and high sulfur, iron-bearing leached dry-collected fume, said green balls being characterized by having the strength to survive at least ten drops from a height of 18 inches onto a 1 inch thick steel plate in a drop test and having a compression strength of at least 15 pounds per square inch and which resist degradation during handling and transport.

SUMMARY OF THE INVENTION

In accordance with the present invention wet-collected iron-bearing fume, dry-collected and leached iron-bearing fume and/or mixtures of wet-collected iron-bearing fume and water leached iron-bearing dry-collected fume are substantially instantaneously dried in a spray dryer. The dried fume is impact-fractured in a one point impact step to increase the surface area and to form dry, fresh, clean, angular fracture surfaces on a portion of the fume. The impacted fume is then balled on a balling device into green balls. Moisture required for balling is added to the fume on the balling device. The green balls produced in the process are characterized by having sufficient strength to survive ten drops from a height of 18 inches in a drop test, have a compression strength of at least 15 pounds per square inch and are sufficiently strong to support a load and resist degradation during transportation and handling and can be charged into steelmaking furnaces.

PREFERRED EMBODIMENT OF THE INVENTION

Wet-collected iron-bearing fume and mixtures of wet-collected iron-bearing fume and/or water leached high sulfur iron-bearing dry-collected fume which have been formed in steelmaking furnaces can be processed into green balls suitable for charging into steelmaking furnaces. By green balls we mean agglomerates generally spherical in shape which have been formed on a balling device, usually without the addition of a binder material other than water, and which have in particular not been subjected to high heat to increase their strength and hardness.

The moist fume particles are initially dried substantially instantaneously. Small agglomerates comprised of adhering fume particles tend to be formed during this drying. The dried fume is then impacted, or impact-fractured, to form dry, fresh, clean, angular fracture surfaces on a portion of the particles and agglomerates. The impacted dried fume is charged onto a balling device. Sufficient moisture, which is required for balling, is added to the impacted fume on the balling device. The green balls produced have a moisture content of between about 7% to about 12% when discharged from the balling device.

Fume is obtained from steelmaking furnaces, such as a basic oxygen furnace and an open hearth furnace.

Basic oxygen furnaces are equipped with two types of exhaust hoods. In the first or "open" arranged, the exhaust hood is positioned a short distance above the open end of the basic oxygen furnace. As the exhaust gases pass upwardly from the furnace into the exhaust hood, air is drawn into the exhaust hood through a space between the hood and the furnace. A portion of the oxygen in the air reacts with carbon monoxide in the exhaust gases to form carbon dioxide, thereby increasing the amount of carbon dioxide in the exhaust gases. The remaining oxygen reacts with metallic constituents in the gases. As a result, substantially all the iron found in the exhaust gases in the form of fume is usually in a high state of oxidation.

In the second or "closed" arrangement, the bottom of the exhaust hood is contiguous with and rests atop the basic oxygen furnace. Air is thus excluded from mixing with the exhaust gases passing from the furnace. As a result, some of the iron in the exhaust gases remains in the metallic state and substantially all of the iron is in a lower state of oxidation than in the above described open arrangement. The amount of fume carried from the basic oxygen furnace is also generally less in the "closed" or second arrangement than in the "open" or first arrangement. In any event, fume also varies in chemical composition from plant to plant and from furnace to furnace.

A specific analysis which is typical of the general analysis of open hearth furnace fume and basic oxygen furnace fume is as follows:

| Compound | Percent in Open Hearth Furnace | Basic Oxygen Furnace[b] |
|---|---|---|
| *Fe[T] | 65.2 | 54.0 |
| Silica | 0.64 | 2.17 |
| Alumina | .15 | .12 |
| Zinc[a] | 1.70 | 3.16 |
| Lime | 1.02 | 6.09 |
| Magnesia | .75 | 2.73 |
| Sulfur[a] | 0.43 | .07 |
| Manganese | 0.26 | .90 |
| Carbon | 0.14 | 1.52 |
| Lead[a] | 0.07 | .24 |

*Total Iron present in the fume as iron oxides
[a]Zinc oxides, lead oxides, sulfur oxides or sulfides reported as the elements zinc, lead and sulfur, respectively
[b]Fume from furnaces equipped with air-tight hoods contain some metallic iron and iron in a lower state of oxidation than furnaces not so equipped. The amount of fume generated in such furnaces is less than in furnaces not so equipped.

A typical size consist of fume from steelmaking furnaces follows:

| Microns | Mesh Size | % |
|---|---|---|
| 149–74 | −100, +200 | 0.3 to 4.0 |
| 74–37 | −200, +400 | 2.0 to 10.0 |
| 47–25 | −400, +500 | 4.0 to 10.0 |
| less than 25 | −500 | 75 to 95 |

As noted above, in the table of typical size consist of fume, about 75 to 95% of the particles in fume are about 25 microns or less in diameter. Due to the fineness of the particles, fume, per se, is not charged into basic oxygen steelmaking furnaces because it would be immediately carried away by the exhaust gases issuing from the furnace. It is thus necessary to agglomerate the fume prior to charging it into a steelmaking furnace.

As noted previously, fume collected from steel-making furnaces can be wet-collected or dry-collected. In the case of wet-collected fume the fume and the moisture used to remove the fume from the exhaust gases together form a slurry which usually contain about 1% solids by weight. On the other hand, dry-collected fume which has been water leached to reduce the sulfur content usually contains between about 5 to about 10% by weight. As is well known to those skilled in the art, slurries which contain 1 to 10% solids by weight cannot be agglomerated. It is necessary to reduce the moisture content of the slurries, that is, thicken the fume before the solids can be agglomerated. Both the wet-collected iron-bearing fume and the water leached iron-bearing fume are thus preferably initially passed to thickeners to be dewatered. The slurries are allowed to remain in the thickeners for a time to allow the solids to settle. The solids from the thickeners are mixed and passed to a second thickener. The solids removed from the bottom of this second thickener also contain between 45 to 65% water by weight. The moisture content is, however, too high to permit the agglomeration of the solids. It is thus necessary to reduce the moisture content to below about 12% water by weight.

The solids can be substantially instantaneously dried, that is, have substantially all the moisture removed, in a flash or spray dryer. The size of the spray dryer is predicated upon the amount of water which it is desired to remove in a given time. Slurry containing 45 to 65% water by weight can be dried in a dryer which can, for example, accommodate a feed rate of between 80 gallons per minute to 100 gallons per minute of slurry. Feed rates within this range deliver between 10 tons per hour to 14 tons per hour of solids on a dry basis.

The slurry is sprayed into the spray dryer in the form of small droplets. Each droplet may contain one or a plurality of particles of fume surrounded by water. The water is substantially instantaneously vaporized by hot gases which are blown upwardly at a temperature of about 1200° F. (648° C.) in the spray dryer to contact the sprayed fume. The hot gases are cooled to about 280° F. (138° C.) as they contact the slurry and vaporize the water. The substantially instantaneous vaporization of water causes the particles of fume in the droplets to adhere to each other and to shrink in size to produce small dense spheroids comprised of adhering particles of fume. The dried fume discharged from the dryer contains individual particles of fume and small dense spheroids of adhering fume particles.

The formation of the small dense spheroids effectively reduces the surface area of the fume. The spray dried fume has an aggregate surface area of less than 8,000 square centimeters per gram as measured by the standard Blaine Surface Area Test, ASTM C204-73. A material having a Blaine surface area of less than 8,000 square centimeters per gram is difficult if not impossible to ball into a strong agglomerate. It is, therefore, necessary to increase the surface area of the dried fume.

The surface area of the fume can be effectively increased by impacting the fume in an impact mill wherein a portion of the fume particles are subjected to one-point impact fracturing. The one-point impact fracturing step increases the Blaine surface area of the fume to more than 8,000 square centimeters per gram, and preferably to at least 12,000 square centimeters per gram. Additionally dry, fresh, clean, angular fracture surfaces are formed on a portion of the fume, as opposed to less clean and angular fracture surfaces which would be obtained in other impacting mills, such as, for example, a ball mill where the fume would be subjected to impact and grinding from several directions at once.

It is possible to impact fracture only that portion of the dried fume which has been formed into small dense spheroids in a one-point impact mill and thereby to form fracture surfaces which are particularly effective to aid agglomeration. When the fume particles and fume spheroids are impact-fractured, strong green balls which will resist degradation may be produced from the impacted material.

The dried fume is fed in a typical impact-fracturing operation onto a rotor which is rotating at a desired speed such that the small dense spheroids will be hurled against a target at a velocity which will result in the fracture of the spheroids. A portion of the coarser particles of fume will also be fractured, but the smaller particles will not be fractured. Consequently, by the use of a one-point impact fracturing mill, it is possible to fracture that portion of the dried fume which had been formed into spheroids, while maintaining the integrity of the smaller fume particles, thus increasing the surface area without reducing the size of the smaller particles.

Impact fracturing mills are often referred to as "impact grinding mills." However, since "grinding" has a connotation of comminuting between grinding surfaces, or in other words by multiple point impact and also abrasion the terminology impact-fracture mill is more correct.

After impacting, the freshly fractured fume particles are formed into green balls suitable for charging into steelmaking furnaces. The impacted fume is fed to a balling device, such as a cone or disc type balling apparatus well known to those skilled in the art. Dry impacted fume is fed onto the balling device and the moisture required for balling is added to the fume on the balling device.

It is well known to those skilled in the art that to material which is to be balled there must be added moisture in amounts sufficient to obtain a moisture content which varies between 7 to 12% in the balled material in order to attain effective agglomeration. The exact range of moisture necessary to ball any given material composition may vary within these limits and is customarily determined by actual trial and error.

The iron-bearing wet-collected fume from various steelmaking furnaces is thickened in individual thickeners. Dry-collected fume from an open-hearth precipitator is water leached to reduce the sulfur content and is thickened in a thickener. Water leached fume from a basic oxygen furnace is also thickened in a thickener. The thickened materials are mixed together to form a single slurry composed of water and fume and containing between 35 to 55% solids. The slurry of fume is dried in a spray dryer. The water in the slurry is substantially instantaneously vaporized in the spray dryer.

The dried fume is then impacted in a one-point impact step. New, dry, fresh, clean, angular fracture surfaces are formed on these particles of fume and fractured spheroids.

The formation of the new, dry, fresh, clean, angular fractures on the surface of a portion of the fume increases the Blaine surface area of the fume from less than about 8,000 square centimeters per gram to more than about 8,000 square centimeters per gram and preferably to not less than 12,000 square centimeters per gram.

The impacted fume is next passed to storage for use as needed. The impacted fume is removed as needed from storage and fed to a balling device. Moisture needed for balling is added to the fume on the balling device. Green balls within a size range of about ⅜ of an inch to 1¼ inches in diameter are produced on the balling device. All the green balls are substantially spheroidal in shape and can be charged into steelmaking furnaces.

The operation of agglomerating or balling devices such as discs and cones, drums and the like is well known to those skilled in the art and the operation of such devices forms no part of the present invention, except that all the moisture required for balling should be added to the fume material during the actual balling operation.

In the balling of dry fume about 7 to 12% moisture will normally be used to cause agglomeration of the dry material into green balls. The water serves as a binder for the particles causing them to adhere together. Other binders such as bentonite or the like may also be used along with the water. As is well known, the exact amount of moisture which can be used to effect agglomeration of any given composition of material will vary widely within the broad range of 7 to 12% and cannot usually be more than generally estimated beforehand. Even fumes from the same steelmaking furnace may vary significantly from time to time with respect to the exact range of moisture required for effective agglomeration. Agglomeration, at the present time at least, can best be characterized as an art rather than an exact science. The operator of a balling or agglomerating device will thus normally vary the amount of moisture added to the material on the balling device within the broad stated ranges and also the position at which the water is fed into the material until he recognizes that proper agglomeration is being attained.

Although the mixing of different types of fume from several different sources has been described for illustrative purposes, any individual moist iron-bearing fume or any mixture of moist iron-bearing fume can be processed into satisfactory green balls.

The drop test is a test well established in Industry and consists of allowing balls or agglomerates, for example, the green balls of the invention, to fall freely from a height of 18 inches onto a flat steel surface, such as a steel plate usually about one inch in thickness. The number of drops which the balled material survives before it fractures is an indication of the strength of the balls. It has been found that the final green balls of the present invention will withstand not less than ten drops in order to have adequate strength to be used as raw material for recharging to steelmaking furnaces. Green balls which do not have the desired drop strength and compression strength may sometimes survive degradation and be successfully charged into steel-making furnaces. However, a large percentage, and in many cases up to 60% or more, of low strength green balls will be destroyed, resulting in the recycling of a large amount of fines, which is very undesirable.

Substantially all of the green balls produced will withstand ten drops in the drop test and in many instances many more drops, up to 20, 30, or even as many as sixty drops. Many of the green balls show no indication of fracture no matter how many times they are dropped. By stating that substantially all the green balls will survive ten drops in the drop test, we do not mean to rule out the production of isolated balls which will not meet specifications. In an agglomeration process there are always occasional deviant or defective balls which for some reason may not have agglomerated together correctly. The standard height of 18 inches in the drop test is significantly related to the stress to which such balls are subjected during normal handling and was originally picked because the drop from one conveyor belt to another in industrial equipment is often about 18 inches. The principal consideration in the production of suitable balls for charging into a steelmaking furnace is that the balls shall not be broken up or degraded sufficiently so that a significant amount of fines is produced, since any such fines will be useless or even detrimental in the operation of the furnace.

Wherever percentages are mentioned in these specifications and claims, such percentages are on a weight basis unless otherwise noted.

In a specific example of the invention, 100 tons of basic oxygen furnace fume collected in a wet scrubber and having a chemical composition and size consist as follows:

| Chemical Composition | |
|---|---|
| $Fe^T$ | 53% |
| $SiO_2$ | 2.2% |
| $Al_2O_3$ | .15% |
| Zn | 2.1% |
| CaO | 7.4% |
| MgO | 3.5% |
| S | 0.12% |
| Mn | 0.9% |

| Mesh Size | Size Consist Cum. % | Microns |
|---|---|---|
| −100, +200 | 0.36 | 74 |
| −200, +400 | 2.36 | 37 |
| −400, +500 | 6.10 | 25 |
| −500 | 93.9 | 25 | was mixed with 100 tons of open hearth fume which was collected in an electrostatic precipitator, leached with water and after leaching, had a chemical composition and size consist as follows:

| Chemical Composition | |
|---|---|
| $Fe^T$ | 66.3% |
| $SiO_2$ | 0.57% |
| $Al_2O_3$ | 0.15% |
| Zn | 0.90% |
| CaO | 0.72% |
| MgO | 0.65% |
| S | 0.08% |
| Mn | 0.25% |

| Mesh Size | Size Consist Cum. % | Microns |
|---|---|---|
| −100, +200 | 3.15 | 74 |
| −200, +400 | 9.50 | 37 |
| −400, +500 | 13.84 | 25 |
| −500 | 86.16 | 25 | and 80 tons of open hearth fume collected in a scrubber and having a chemical composition and size consist as follows:

| Chemical Composition | |
|---|---|
| $Fe^T$ | 66.2% |
| $SiO_2$ | 0.47% |
| $Al_2O_3$ | 0.15% |
| Zn | 1.32% |
| CaO | 0.93% |
| MgO | 0.38% |
| S | 0.06% |
| Mn | 0.25% |

| Mesh Size | Size Consist Cum. % | Microns |
|---|---|---|
| −100, +200 | 3.15 | 149−74 |
| −200, +400 | 9.50 | 74−37 |
| −400, +500 | 13.84 | 37−25 |
| −500 | 86.16 | 25 |

The mixture of the three fumes was thickened in a thickener to produce a slurry containing 42% solids. The thickened fume was fed at a rate of 90 gallons per minute into a spray-dryer. Hot gases having an inlet temperature of 1200° F. (648° C.) were blown upwardly to contact the fume and vaporize the water. The gases had an exit temperature of 280° F. (138° C.). The fume had a temperature of about 280° F. (138° C.) when discharged from the dryer. About 12½ tons of fume on a dry basis were produced in 1 hour.

The dried fume was impacted in a "Centrimil" having a 24 inch diameter rotor, rotating at a speed of 3500 revolutions per minute to fracture the spheroids formed during drying. The rate of feed was 12½ tons per hour. The Blaine surface area of the fume before impacting was 7,500 square centimeters per gram. Th Blaine surface area of the fume after impacting was about 12,000 square centimeters per gram.

The fume was next fed at a rate of 35 tons per hour to a balling disc, which was 18 feet in diameter. The disc was rotated at 10 revolutions per minute. Sufficient moisture was added to the fume on the balling disc to produce green balls having a moisture content of about 10% which was the moisture found necessary to ball this particular material. The green balls ranged in size from ⅜ of an inch to ¾ of an inch in diameter. The green balls had a compression strength of 18 pounds per square inch, a bulk density of 130 pounds per cubic foot and survived an average of fourteen drops when dropped from a height of 18 inches onto a flat steel plate in a test in which samples of balls, each sample containing about a quart of balls, were collected and random series of ten balls each were selected from each sample and tested. None of the balls tested from the particular samples survived less than 10 test drops and many survived many more than 10 or even 14 drops. The green balls were charged into a hopper car and were transported to the basic oxygen furnace shop. The green balls were then emptied into a storage bin and were transported by a conveyor system to a basic oxygen furnace. No significant degradation of the green balls occurred as determined by visual observation and no difficulty was encountered in refining the green balls into steel.

The sharp cleavage of the particles which forms the proper fracture surface appears to be attainable only in a one-point fracture operation such as is attained in an impact fracturing mill when the material is flung against a target and strikes the target against one side causing fracture by impact rather than fracture between two surfaces such as is accomplished in a ball mill, a hammer mill or the like. In an impact mill, furthermore, the particles are struck only once and then leave the mill. In various grinding mills, on the other hand, the particles are fractured between opposing surfaces and are, furthermore, usually fractured or ground several times so that original fracture surfaces are refractured several times, thus losing their freshness and initial angularity.

It is evident that any sort of apparatus which fractures particles and provides fresh, clean, dry, angular fracture surfaces could be used. The inventors advance no particular theory at this time as to the exact mechanism by which the fresh, clean, dry, angular fracture surfaces aid in attaining strong, degradation resistant green balls. It is only evident that the provision of such fracture surfaces has a very dramatic effect upon the strength of the final green balls which are produced.

I claim:

1. Green balls suitable for charging into steelmaking furnaces and derived from particles of fume formed in steelmaking furnaces, said fume comprising at least one fume taken from the group consisting of wet-collected fume and dry collected water leached fume and mixtures thereof, said particles of fume being spray-dried to substantially instantaneously dry the fume, impacted in a one-point impact step to fracture any spheroids formed during spray-drying whereby new fracture surfaces are formed, and the Blaine surface area of said fume is increased to more than 8000 square centimeters per gram and balled on a balling device whereon moisture required for balling is added to the fume, said green balls consisting of water and said particles of fume and being characterized by having a moisture content of 7 to 12% by weight, a moist compression strength of not less than 15 pounds, and moist strength sufficient to resist breakage when dropped at least 10 times from a height of about eighteen inches onto a steel plate.

2. A degradation resistant green ball according to claim 1 having a diameter of between ⅜ to 1¼ inches and being suitable for charging into steelmaking furnaces.

* * * * *